United States Patent [19]
Siclari et al.

[11] 3,870,475
[45] Mar. 11, 1975

[54] APPARATUS FOR THE CONTINUOUS PERFORMANCE OF CHEMICAL PROCESSES, MORE PARTICULARY ESTERIFICATION, AND/OR TRANSESTERIFICATION AND POLYCONDENSATION PROCESSES

[75] Inventors: Francesco Siclari; Cesano Maderno; Franco Magnoni; Sergio Fulmini, all of Milan, Italy

[73] Assignee: Snia Viscosa Societa Nazionale Industria Applicazioni Viscosa S.p.A., Milan, Italy

[22] Filed: Sept. 18, 1972

[21] Appl. No.: 289,949

Related U.S. Application Data

[62] Division of Ser. No. 813,914, April 7, 1969, Pat. No. 3,787,481.

[52] U.S. Cl.............. 23/285, 23/252 R, 159/4 S, 239/224
[51] Int. Cl............. B01j 1/00, B01j 4/00
[58] Field of Search............ 23/285, 260, 252 R; 159/4 S, 4 GC, 4 J; 239/222.11, 223, 224

[56] References Cited
UNITED STATES PATENTS

| | | | |
|---|---|---|---|
| 1,447,898 | 3/1923 | Schlossstein | 23/285 |
| 1,629,200 | 5/1927 | Vuhtz | 23/252 R |
| 1,724,627 | 8/1929 | Varnau et al. | 159/4 S |
| 2,525,025 | 10/1950 | Feil | 159/4 S |
| 2,684,287 | 7/1954 | Seavey | 23/252 R |
| 3,386,981 | 6/1968 | Buhtz | 23/285 |
| 3,473,896 | 10/1969 | Halder et al. | 23/285 |
| 3,529,941 | 9/1970 | Tobiassen et al. | 23/285 |
| 3,644,294 | 2/1972 | Siclari et al. | 23/285 |

*Primary Examiner*—Barry S. Richman
*Assistant Examiner*—Bradley R. Garris

[57] ABSTRACT

Apparatus for continuously performing chemical processes and reactions which require heat administration from the outside and are conducive to the evolution of volatile by-products, such as the processes leading to the production of spinnable polyesters, comprising a reactor having substantially vertical metal walls, means for introducing the reactant and, if desired, a recycled reacted product at the reactor top, centrifuging means for hurling the material or materials introduced at the top of said walls so that it or they descend in the form of a liquid film therealong, and means for recycling a fraction of the product, which has been collected at the base of the reactor, towards the top thereof.

4 Claims, 1 Drawing Figure

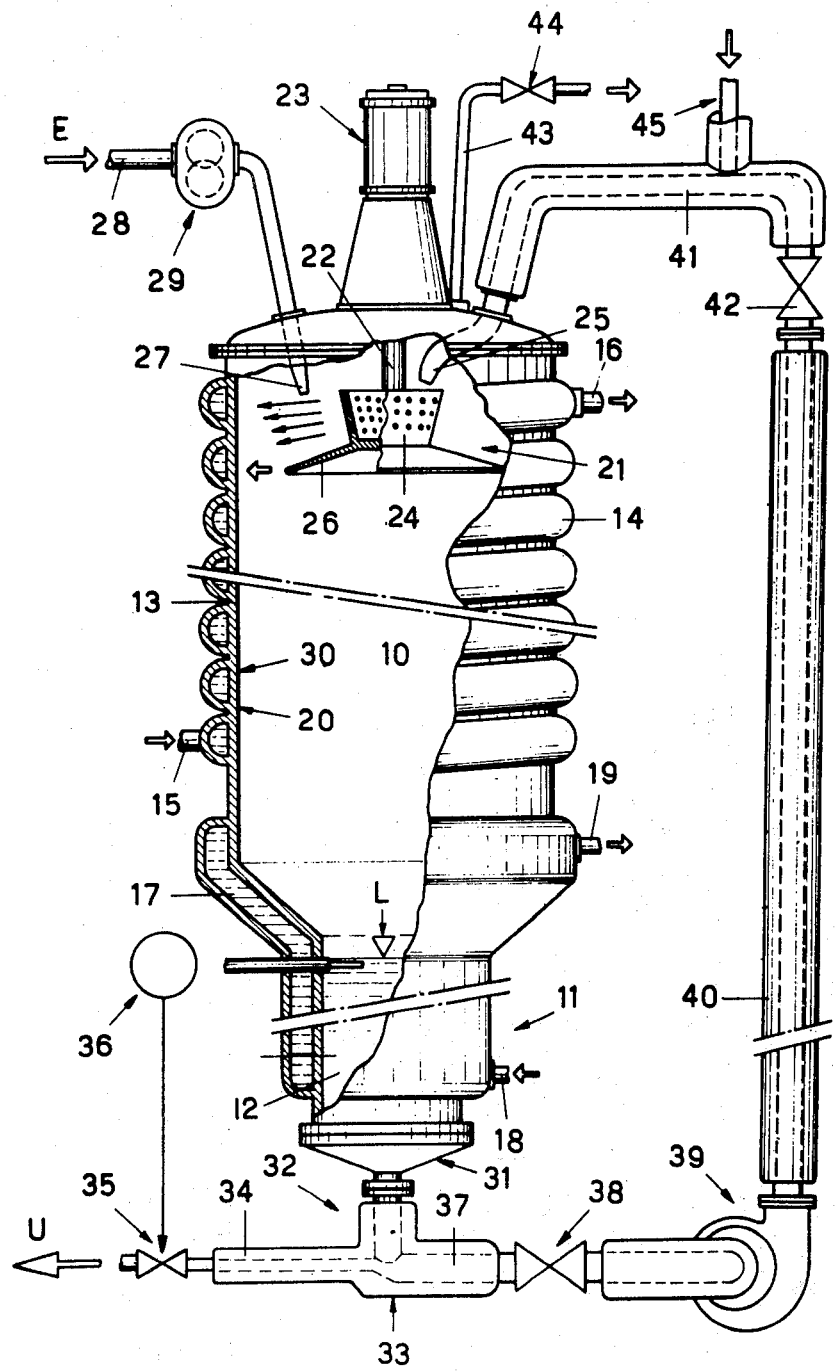

APPARATUS FOR THE CONTINUOUS PERFORMANCE OF CHEMICAL PROCESSES, MORE PARTICULARY ESTERIFICATION, AND/OR TRANSESTERIFICATION AND POLYCONDENSATION PROCESSES

This application is a division of our application Ser. No. 813,914, now U.S. Pat. No. 3,787,481, filed Apr. 7, 1969.

This application relates, in general, to means for continuously performing chemical processes, in which, in order that reaction conditions and removal of volatile components and reaction products may be encouraged, an active heat exchange is required and, more particularly, a supply of heat to the reaction mass. The procedure and means considered by the present invention find a particularly advantageous application in esterification, transesterification and possibly also polycondensation processes, as employed for the continuous production of polyesters.

These fields of application, obviously, are but an example of practical applicability of the invention in the industrial field. The invention can be extended to any other field of chemical processes which exhibit equivalent or similar conditions and thermal requirements.

On account of the nature of the present invention, and in order to give a better understanding of its features and objects, the idea of "steady condition", and more particularly of "steady thermal condition" of the reactions involved will be repeatedly recalled in the following. Attention is directed to the fact that, for the interpretation of such an idea, the criteria and the definitions should be adopted as set forth in the book "Pilot Plants, Models and Scaleup Methods in Chemical Engineering"—Chapter VI (McGraw-Hill Series in Chemical Engineering)—McGraw-Hill, Publishers, New York, 1957.

It is known that, for the performance, more particularly for the continuous performance of processes of the kind referred to, the solution is required of a number of technical problems which often are mutually conflicting, in order that a favorable trading-off may be achieved between the speed at which the reaction can be carried out (i.e. the quantitative yield of the installation) and the conditions under which the process takes place. The occurrence of secondary of detrimental reactions, liable to alter the qualitative properties of the desired product or anyhow disturb the regular process run, should be simultaneously overcome.

By way of a short commentary of the foreseen and predominant field of application of the invention, it is known that the chemical processes performed with the apparatus disclosed in the present application should comply with well defined requirements. For example, esterification processes by reaction of an alkylene glycol, such as ethylene glycol, with a bicarboxylic aromatic acid, such as terephthalic acid, are accelerated as the temperature is increased. Said increase should be kept, however, within definite limits, to avoid secondary degenerative phenomena. Moreover, during progress of the main reaction, undesirable secondary reactions such as polyglycol formation could take place to a greater or lesser degree. The higher the speed at which the main reaction is completed, that is, the shorter the stay time of the reaction mass in the environment in which the process takes place, the lower is the proportion of the polyglycol formation. In addition, the concentration of free glycol has an accelerating action towards polyetherification, and thus said concentration should be kept the lowest possible.

What has been said above holds good also for other cases, for example, in processes of transesterification of diesters of bicarboxylic acids with an alkylene glycol.

In addition, the reaction run is influenced by phenomena of a properly physical nature, which bring about the ease and completeness of the removal of water, alcohol or free glycol, in the gaseous state, from the liquid mass wherein the reaction is in progress. Said removal, in fact, is countered by the viscous resistances which oppose the migration of the particles of the volatile component up to the surface of the liquid mass. It can be said that the ease of removal is an inverse function of the thickness of said mass.

Said chemical processes are carried out in a reactor consisting of a metal vessel whose walls are heated from outside, generally by a thermal medium, e.g. biphenyl, which is circulated through a double bottom or jacket which wraps, at least partially, around said reactor. As is known, the velocity and the magnitude of heat exchange between the wall and the reaction mass are proportional to the temperature differential which is established (or maintained) between the inner face of the metal wall (which yields heat) and the liquid layer which adheres to said surface; the latter receives the heat and transfers it to the farther layer of the mass from which the volatile products of the reaction are to be removed.

In view of the foregoing, the principal object of the present invention is to provide means by which both the quantitative and qualitative yield of the reaction can be exalted with respect to the teachings of the prior art, in quite an unpredictable and surprising manner.

Still another object of the invention is to provide an apparatus by which the above enumerated and other favorable reaction conditions can be established and maintained for the rapid continuous performance of chemical processes of the kind referred to above, and under said favorable conditions.

More particularly, it is an object of the invention to provide apparatus by which an active heat exchange between the reactor walls and the reaction mass can be ensured, by keeping said mass at temperatures which are close to the maximum temperatures which are consistent with rapid course of the process without producing any pyrolytic phenomena, said active heat exchange being effected, on the other hahd, by confining to desirably small values the temperature differential between the heat-yielding metal wall and the average temperature of the mass adjacent to said wall surface.

The apparatus comprises means for metered continuous introduction of the starting and the intermediate materials and compounds, a reactor having metal walls, means for spraying said materials and compounds against the top of an essentially vertical face of said walls, forming a liquid film descending along said surface, means for continually removing the reacted product from the reactor's bottom, preferably in amounts which are many times in excess with respect to that corresponding to the quantity of product resulting from said metered introduction, means for the removal, for the subsequent treatments, of said corresponding quantity of the reacted product, means for continuous recycling of the excess of said product towards the top portion of said reactor, and means for continuous spraying of said excess quantity against said top portion of said surface so as to form a liquid film descending along said surface, said materials and compounds being dispersed within said film and receiving the thermal energy which is continually yielded by said surface.

The foregoing and other more specific features of the invention, along with the showing of the principal advantageous effects and treatment conditions, will be better understood as the ensuing detailed description proceeds of nonlimiting examples of application and use of the apparatus which is shown in the accompanying drawing, partly in side view and partly in vertical cross-sectional view, the merely structural parts and ancillary means contrivances being omitted, since they can be individually adapted by applying the current knowledge of the art.

As shown in the drawing, the apparatus essentially consists of a reactor formed by a vertically elongate vessel, having an essentially cylindrical outline and comprising, in general, an upper chamber 10, and a lower chamber 11, having the same diameter as the upper chamber or a lower diameter (as shown) in which a mass 12 is held. The level of said mass determines the stay time in the reactor, expressed in terms of the ratio of the overall amount of material which is present at every instant of time in the reactor, to the amount of reacted product drawn in the unit of time.

The metal walls 13 of the chamber 10 are heated by a thermal medium, for example biphenyl, which is continuously circulated through a coil 14 having an inlet 15 and an outlet 16. The underlying portion of the reactor can be advantageously heated, in turn, by the same, or another thermal medium circulated through a jacket 17 having an inlet 18 and an outlet 19. The means adapted to assure heating and circulation, at the desired temperatures and rates of flow, of said thermal media, are neither described nor shown herein since they are quite conventional.

At the top of the interior of the reaction chamber 10, means are provided for spraying onto the upper portion of the inner surface 20 of said chamber the starting compounds and materials and said excess of reacted product. Preferably, said means comprise a rotary assembly 21, supported by a shaft 22 and driven by an appropriate motor 23, said assembly comprising a foraminous container 24 into which said excess of reacted product is continuously fed through a spout 25, and an underlying disc-like body 26 on which the material to be reacted is fed from the outside through a spout 27, receiving its supply through conduit 28 in an amount metered for example by a gear pump 29.

Said container 24, which overlies the rotary disc 26, hurls the liquid product onto said surface 20, thus forming a liquid film 30 thereon, the material tangentially hurled by the edge of the disc 26 being fed into said liquid film.

To the bottom 31 of the reactor is connected an outlet duct 32 which comprises several appropriate removal means such as conveying screws, pumps and the like, not shown in the drawing, said duct being branched at 33 into a branch 37 and an outlet duct 34, controlled by a valve 35, the latter valve being controlled, in turn, by a conventional device 36 which controls the level L of the liquid mass 12 so that the outgoing reacted product U has a rate of flow adapted to keep the said level L constant, and is consistent with the inlet rate of flow E of the starting materials.

The level L of the liquid mass can also be controlled by conventional devices which act on the incoming material in the tube 28, which have not been shown.

The other branch 37 into which the outlet duct 32 is split, has a valve 38 and leads to a pump 39 by which, through ducts 40 and 41 and a second valve 42, the excess material issuing at 32 is returned to said spout 25 for the formation of said liquid film 30.

Obviously, whenever it is either possible or advisable to promote and/or complete the reaction by a mere falling down of the material introduced from outside only, in the absence of said circulating excess, the above described parts, intended for drawing and circulating said excess, can be dispensed with. These cases can be, for example, polycondensations processes, e.g. of polyesters, polyamide demonomerization treatments or treatments for removing comparatively low-boiling compounds or products and the like.

In additon, the reactor comprises means adapted to maintain the desired temperature for the circulating product. For example, as shown, said means comprise appropriate jacketing of the several ducts through which a thermal medium is caused to flow.

Obviously, the reactor also comprises means, of which a duct 43, and associated valve 44 are an example, for removing the volatile compounds, such as water and alcohol produced by the reaction and the gasified glycol. Conduit 43 can be advantageously connected to an ancillary device for stripping, for example glycol from water or alcohol, for condensing said glycol and recycling it with advantage to the reactor, for example by reintroducing it at 45 into the flow which is being continuously recycled to the rotary foraminous container 24.

Apparatus as described above, or an equivalent thereof, is capable of fulfilling the conflicting requirements outlined above, and of ensuring that the reaction may take place under surprisingly quick and favorable conditions, predominantly under steady thermal conditions.

Bear in mind that the amount of the reacted liquid product which is continuously circulated between the outlet 32 and the spout 25 for feeding the reactor again, is many times a multiple (very often many tens of times a multiple) of the amount discharged at U. Along the metal surface 20 of the walls 13, a liquid film 30 is maintained, which forms a mass having a high temperature (due to the heating of the wall 13) in which the starting material is evenly dispersed and by which said material is immediately and evenly heated. This condition permits, inter alia, to introduce at 27 the starting material at the ambient temperature or, anyhow, at a comparatively low temperature. This is a distinct advantage especially when the starting material is a slurry in which a bicarboxylic aromatic acid is homogeneously mixed with an alkylene glycol.

The subject device permits the best results to be obtained when the reacted material has a low viscosity. In such a case, indeed, the liquid film 30 falling along the surface 20 is extremely thin. This is conducive to two paramount advantages: heat is rapidly transferred through said reduced thickness of the liquid film, the several points of which thus have very close and virtually equal temperatures, and the volatile components, promptly vaporized, are immediately and easily stripped from the liquid mass on account of the extremely short migration paths of the particles which are thus immediately set free from the liquid.

The ready absorption of thermal energy by said liquid film 30 promotes the desired active heat exchange even when keeping at extremely low values the temperature differential between the irradiating metal surface 20 and the liquid which forms said film 30. This condition thus permits the descending liquid film to be maintained at the temperature most favorable to the reaction, even though said temperature is close to the one which could produce pyrolytic phenomena (i.e. the maximum temperature consistent with the regular reaction course), without having said surface 20, and thus the limiting layer of the liquid film, which contacts said surface, reach said dangerous temperature.

Said liquid film 30 can thus be regarded as the principal environment and place of the reaction, the latter taking place under steady thermal conditions. On the other hand, the reaction is completed, due to the purposeful extension of the stay time, within the underlying mass 12, said completion taking place, as a rule, under steady chemical conditions.

It should be observed that, even though a continuous circulation of the predominant fraction of the reacted product exists between the bottom 11 and the top of the reactor, the working conditions of the subject device cannot be compared to those of the so-called "recycle processes". As a matter of fact, the product which is transferred through the ducts 37–41 is the same as the product being discharged at U and such a flow can be compared, rather, to a continuous and even blending of a product in a homegeneous phase.

According to another aspect, the liquid film 30 represents the surface of a liquid mass, from which gaseous compounds are set free. Heat exchange phenomena essentially occur within said liquid film 30, so that the liquid mass can be regarded as being present, to the ends of the reaction, in the form of a thin liquid film spread over a heat-yielding surface. For proper stay time of the liquid in the reactor, in correlation with the time during which the liquid mass is subjected to heat exchange, the effective surface of heat exchange corresponds to the product of the geometrical surface of the liquid film 30 by the ratio of the rate of flow of the product circulated through the circuit 37–41 to the rate of flow at the outlet U.

The use of the apparatus without recycling is particularly helpful in the demonomerization of the polyamides, in which the molten mass of a polymer obtained in a prior operation, and containing percentages of monomer of about 8 to 9%, is fed by a pump to the perforated basket 21 in the upper part of the reactor. The molten polymer is hurled, by centrifugal force, in sprays against the upper part of the cylindrical wall 20 of the reactor. The film 30 thus formed descends toward the lower part of the reactor; and there takes place evaporation of the monomer under vacuum (stripping of the monomer). The molten mass is collected at the bottom of the apparatus, and removed. This product contains a percentage of monomer much lower than the starting percentage.

The foregoing discussion can be taken as an explanation of the surprisingly advantageous results of the invention, and, more particularly of the establishment of extremely favourable steady thermal conditions, in which a large amount of thermal energy can be transferred between the heat-yielding surface 20 and the liquid mass held in the reactor, while concurrently keeping within extremely low values, in the order of a few degrees centrigrade, for example, less than 6°C, the temperature differential between the temperature of said surface (that is of the molecules which are present in the liquid layer contacting said irradiating surface) and the average temperature of the whole liquid mass. Obviously the ease with which the vaporized fractions are removed from said mass greatly contributes towards a regular and quick reaction course, along with the homogenization resulting from a continuous circulation.

Having thus described our invention, what we claim is:

1. Apparatus for continuously performing chemical and physical processes and reactions conducive to the formation and treatment of liquid intermediates with concurrent production of volatile coproducts of the reaction, such as esterification, transesterification and polycondensation processes forming the initial and intermediate stages of methods for the production of polyesters in a continuous run, comprising a reactor having a metal peripheral wall whose inner face is vertical at least in the upper and middle portions of the reactor and which defines a chamber with a vertical axis, means for circulating a fluid thermal medium in contact with the external surface of said wall to heat said wall, a shaft rotatably mounted in said reactor with the axis of said shaft coaxial with the axis of said chamber, a vessel having a perforated perimetrical wall secured to said shaft at a first level in the upper part of said chamber to rotate with said shaft, a disc secured to said vessel at a lower level than said first level and forming a flange around said vessel, said flange extending substantially radially outwardly from said perimetrical wall, means for introducing into the reactor a reagent liquid said introducing means being located between said inner face of said peripheral wall and said perimetrical wall and positioned to cause said reagent liquid to drop onto the upper surface of said disc, means for removing a reacted liquid product continuously from the bottom of said reactor, means for withdrawing a portion of the removed reacted product for subsequent treatment, means for recirculating to the top of the reactor and into said vessel at a point closer to said shaft than the point at which the reagent liquid is delivered onto said disc the remaining portion of the removed reacted product, and means for rotating said shaft and said vessel and said disc therewith so that the recirculated reacted liquid product is thrown through the perforations in said vessel wall onto the inner face of said reactor wall and the reagent liquid is hurled by said disc also against said inner face but at a level lower than that which the recirculated liquid product is projected against said inner face so that the reagent liquid is dispersed into a liquid film formed by the recirculated liquid product on said inner face and the two liquids flow downwardly together on said inner face mingling and absorbing the heat therefrom.

2. Apparatus as claimed in claim 1, wherein said disc has a conical-shaped upper surface onto which the reagent liquid is introduced.

3. Apparatus as claimed in claim 1 wherein said reactor has at the bottom thereof a space communicating with said chamber for the collection and retention, in the form of an essentially undisturbed liquid mass, of the reacted product, and the means for removing the reacted liquid product from the bottom of said reactor includes a discharge port at the bottom of said space, a duct connected to said discharge port and an adjustable valve for adjusting the rate of discharge of the reacted product through said discharge port.

4. Apparatus as claimed in claim 3 having means surrounding said space and said duct for maintaining an elevated temperature in said space and duct.

* * * * *